(12) United States Patent
Abernethy et al.

(10) Patent No.: US 8,880,865 B2
(45) Date of Patent: Nov. 4, 2014

(54) SYSTEM, METHOD AND APPARATUS FOR CAUSING A DEVICE TO ENTER AN ACTIVE MODE

(75) Inventors: Simon George Abernethy, Eindhoven (NL); Alexander Sinitsyn, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 539 days.

(21) Appl. No.: 13/148,075

(22) PCT Filed: Feb. 9, 2010

(86) PCT No.: PCT/IB2010/050577
§ 371 (c)(1),
(2), (4) Date: Aug. 5, 2011

(87) PCT Pub. No.: WO2010/095075
PCT Pub. Date: Aug. 26, 2010

(65) Prior Publication Data
US 2011/0296163 A1    Dec. 1, 2011

(30) Foreign Application Priority Data
Feb. 20, 2009   (EP) .................... 09153267

(51) Int. Cl.
*G06F 1/32* (2006.01)
*G06F 9/00* (2006.01)
*G06F 3/01* (2006.01)

(52) U.S. Cl.
CPC .............. *G06F 3/011* (2013.01); *G06F 1/3231* (2013.01); *Y02B 60/1289* (2013.01); *G06F 1/3203* (2013.01)
USPC ................... 713/100; 713/1; 713/2; 315/308

(58) Field of Classification Search
CPC .... G06F 1/3231; G06F 1/3265; G06F 3/0346
USPC .......................... 713/1, 2, 100, 300; 315/308
See application file for complete search history.

(56) References Cited

U.S. PATENT DOCUMENTS

| | | |
|---|---|---|
| 6,111,580 A | 8/2000 | Kazama et al. |
| 6,418,536 B1 | 7/2002 | Park |
| 7,379,560 B2 | 5/2008 | Bradski et al. |
| 8,258,708 B2 * | 9/2012 | Van De Sluis et al. ........ 315/149 |
| 2005/0076254 A1 * | 4/2005 | Robinson et al. ............. 713/320 |
| 2008/0136356 A1 * | 6/2008 | Zampini et al. .............. 315/308 |
| 2008/0158358 A1 | 7/2008 | Chanson et al. |

FOREIGN PATENT DOCUMENTS

| | | |
|---|---|---|
| EP | 0492427 A2 | 7/1992 |
| WO | 2008139364 A1 | 11/2008 |

* cited by examiner

*Primary Examiner* — Michael J Brown

(57) ABSTRACT

A device (7) is caused to enter an active mode by determining a coarse level of interest; determining a more refined level of interest in response to determining the coarse level of interest; and causing a device (7) to enter an active mode, in response to determining the refined level of interest.

11 Claims, 6 Drawing Sheets

SYSTEM, METHOD AND APPARATUS FOR CAUSING A DEVICE TO ENTER AN ACTIVE MODE

FIELD OF THE INVENTION

The present invention relates to a system, method and apparatus for causing a device to enter an active mode. In particular, but not exclusively, the present invention relates to a system, method and apparatus for causing a device to enter an active mode using a plurality of sensors for determining interest levels of a user.

BACKGROUND OF THE INVENTION

Many techniques have been developed to activate and/or control a device as a user approaches. For example, whether a users hand approaches a device or the user's attention is directed toward the device. One example of such a known technique is disclosed by U.S. Pat. No. 6,111,580. U.S. Pat. No. 6,111,580 discloses an input unit that attempts to determine whether a user wishes to interact with a device; that is, whether a user's attention is directed toward the device. If such a determination is made, the input unit then determines whether the user performs an act that corresponds to a command. The input unit then controls the device according to the command.

U.S. Pat. No. 6,111,580 discloses various different methods for determining whether a user's attention is directed toward the device, for example, detecting the direction of the user's gaze, detecting the utterance of a predetermined word in the voice of a user, detecting contact of a user on a pressure sensor or switch, detecting a full frontal view of a user's face (for instance, by symmetry) or detection of a specific gesture performed by a user.

However U.S. Pat. No. 6,111,580 requires a complex configuration of sensors in order to detect the user's attention and gesture to generate commands to control the device. Thus the system is inefficient requiring high power consumption and high processor usage.

SUMMARY OF THE INVENTION

The present invention seeks to provide a reliable, accurate and efficient system for causing a device to enter an active mode whilst reducing power consumption and processor usage.

According to a first aspect of the present invention there is provided a system for causing a device to enter an active mode, comprising: a first sensor for determining whether a first condition relating to a first interest level of a user has been met; a second sensor for determining whether a second condition relating to a second interest level of a user has been met in response to the first sensor determining that the first condition has been met, the second interest level being greater than the first interest level; and a device for entering an active mode in response to the second sensor determining that the second condition has been met.

According to a second aspect of the present invention, there is provided an apparatus for use with a device, comprising: a first sensor for determining whether a first condition relating to a first interest level of a user has been met; and a second sensor for determining whether a second condition relating to a second interest level of a user has been met in response to the first sensor determining that the first condition has been met, the second interest level being greater than the first interest level; wherein the apparatus is configured to cause a device to enter an active mode in response to the second sensor determining that the second condition has been met.

According to a third aspect of the present invention there is provided a method of causing a device to enter an active mode, comprising: at a first sensor, determining that a first condition relating to a first interest level of a user has been met; at a second sensor, determining that a second condition relating to a second interest level of a user has been met in response to the first sensor determining that the first condition has been met, the second interest level being greater than the first interest level; and causing a device to enter an active mode in response to the second sensor determining that the second condition has been met.

In this way multimodal sensors can be used to improve reliability and accuracy of determining interest level of a user. Power and processor usage can be reduced by use of the second sensor only once a first condition has been set. Furthermore, the second interest level is greater than the first interest level. Therefore, as a result the device enters an active mode only if a greater interest level is detected, further improving reliability and accuracy of the system whilst reducing power consumption and processor usage.

The second sensor may be configured for transitioning from an energy saving mode (e.g. a relatively low power mode in which the second sensor is not actively sensing) to a sensing mode (e.g. a relatively high power mode in which the second sensor is sensing) in response to the first sensor determining that the first condition has been met. The first sensor may have a lower energy consumption (or a smaller energy footprint) than the second sensor when the second sensor is in the sensing mode. The energy saving mode may be when the second sensor is switched off; thus, the sensing mode would be when the second sensor is switched on, thus, further reducing power consumption of the sensory system.

The first sensor may comprise a memory for recording a sequence of measurements. The first sensor may comprise a processor for analysing measurements in order to determine whether a condition has been met, improving accuracy whilst reducing processor usage.

The first sensor may be a range sensor (e.g. an ultrasonic range sensor, sonar range finder, IR sensor, etc). The first condition may comprise whether a user is located at a range from the device of less than a first threshold range. The first condition may alternatively or additionally comprise whether a user is located at a range from the device that is decreasing and/or unchanging. The first condition may alternatively or additionally comprise whether a user is located at a range from the device that is decreasing above or below some threshold rate. As a result a simple, reliable, lower energy consumption sensor is used.

Alternatively the first sensor may determine a user's attention by detecting a direction of a user's gaze, detecting the utterance of a predetermined word in the voice of a user, detecting contact of a user on a pressure sensor or switch, detecting a full frontal view of a user's face (for instance, by symmetry) or detection of a specific gesture performed by a user.

The second sensor may comprise a memory for recording a sequence of measurements. The second sensor may comprise a processor for analysing measurements in order to determine whether a condition has been met, improving accuracy whilst reducing processor usage.

The second sensor may comprise an image capture device, such as a camera (e.g. a web camera type device) and a gaze detection system. The gaze detection system may comprise a facial recognition unit (e.g. face detection algorithms) and/or a facial orientation determination unit. The facial orientation determination unit may comprise an A/D conversion section (for converting analogue signals from an image capture device into digital signals). This section is unnecessary if the image capture device is a digital image capture device that produces a digital signal. The facial orientation determination unit may comprise a face area detection section, a feature detection section and a gaze direction calculation section. The face area detection section may extract a face area of the user from the digital signal. The extraction may be executed based on skin colour of the user's face. The face area information may be outputted to the feature detection section, which may extract likely positions of facial features (e.g. eyes, eyebrows, nose, mouth and/or ears, or portions of these or other facial features). The gaze direction calculation section may calculate a gaze direction of the user according to the relative positions of one or more facial features on the face. The second sensor can therefore be more complex to determine a greater interest level to reliably detect that the user wishes to interact with the device.

The second condition may comprise whether a user is present; that is, whether that which satisfied the first condition is in fact a person, and not some other object. The second condition may alternatively or additionally comprise whether a user is looking at the device, or where the user is looking relative to the device. The second condition may alternatively or additionally comprise whether a user is looking at the device for more than a predetermined proportion of time (for instance, 50%, 60%, 75%, 80%, 90% of the time, etc) since the first signal was received by the second sensor.

Alternatively the second sensor may determine a user's attention by detecting a distance of a user from the device, detecting the utterance of a predetermined word in the voice of a user, detecting contact of a user on a pressure sensor or switch, detecting a full frontal view of a user's face (for instance, by symmetry) or detection of a specific gesture performed by a user.

The active mode may be a user interaction mode. The user interaction mode may be a mode in which all functions of the device are immediately accessible for a user.

Alternatively, the active mode may be a flirting mode. The flirting mode may be a mode in which the device is powered-up, but in which all functions of the device are not immediately accessible (for instance, a screen saver mode, start-up screen, etc). Alternatively, the flirting mode may constitute some form of advertising mode in which the device advertises its presence to the user by making a noise (jingle, tone, tune beep, chime, welcome sound, etc), illuminating a display or flashing lights, or in which the device enters a welcome mode or presents a third-party advertisement to the user.

In the case where the active mode is the flirting mode, the first sensor may be additionally configured for determining whether a third condition relating to a third interest level of a user has been met, the third interest level being greater than the first interest level. Thus, the third condition may comprise whether a user is located at a range from the device of less than a second threshold range, closer than the first threshold range. The third condition may alternatively or additionally comprise whether a user is located at a range from the device that is increasing, decreasing and/or unchanging. The third condition may alternatively or additionally comprise whether a user is located at a range from the device that is increasing and/or decreasing above or below some threshold rate. The third condition may comprise a refined threshold in a direction of a user's gaze, the utterance of a predetermined word in the voice of a user, contact of a user on a pressure sensor or switch, a full frontal view of a user's face (for instance, by symmetry) or a specific gesture performed by a user.

The device may be additionally configured for transitioning from the flirting mode to a user interaction mode in response to the first sensor determining that the third condition has been met.

The device may be configured for transitioning from the user interaction mode to a standby mode in response to a fourth condition being met, the standby mode being some lower power mode of the device (such as off or sleep) than the user interaction mode (or flirting mode, where applicable) of the device. The second sensor may be configured for transitioning from a sensing mode to an energy saving mode in response to the fourth condition being met.

The fourth condition may comprise whether the first condition ceases to be met. For instance, the fourth condition may comprise whether a user is located at a range from the device outside the first threshold range. The fourth condition may alternatively or additionally comprise whether a user is located at a range from the device that is increasing and/or unchanging. The fourth condition may alternatively or additionally comprise whether a user is located at a range from the device that is increasing above or below some threshold rate. Alternatively the fourth condition may constitute a user's lack of attention. The first sensor may determine a user's lack of attention by detecting a direction of a user's gaze, detecting the utterance of a predetermined word in the voice of a user, detecting removal of contact of a user on a pressure sensor or switch, detecting the absence of a full frontal view of a user's face (for instance, by symmetry) or detection of a specific gesture performed by a user. The fourth condition may alternatively or additionally comprise whether user interaction with the device is absent for a predetermined period of time (e.g. 1 minute, 2 minutes, 5 minutes, 10 minutes, etc).

The system may be configured for providing a non-symmetric response. For instance, the device may be caused to transition from a standby mode to a flirting mode when the first and second conditions are met and to transition from the flirting mode to the user interaction mode when the third condition is met, but not to transition from the user interaction mode to the flirting mode when the third condition ceases to be met. Rather, the device may be caused to transition from the user interaction mode directly to the standby mode when the first condition ceases to be met.

The device may be configured to enter the user interaction mode when user interaction with the device occurs. The system may be additionally enabled to learn from user interaction with the device, by recording the events prior to user interaction with the device occurring and extrapolating in order to better determine the threshold of the conditions referred to above. For instance, if user interaction with the device occurs consistently when the second condition has not been met, the threshold for the second condition is varied so that the system can better predict user interaction with the device.

The device may be a consumer electronics device (e.g. a TV, set top box, etc.), an information display device (e.g. to display energy consumption in the home), an active mirror comprising a mirror and a lamp (wherein the lamp intensity may be adjusted based on the distance of the person from the mirror), or image processing equipment. The device may comprise image capture or recording equipment (located with the second sensor, the second sensor comprising an image capture device) that may be configured to be triggered only when a person is within range and looking at the image capture device.

The first and second sensors may be located in close proximity to the device.

According to one embodiment of the invention, the first sensor determines a coarse level of interest, and the second sensor determines a more refined level of interest, once the coarse level has been determined. The refined level of interest may be determined by measuring a different parameter, or it may be determined by applying a stricter test to a measurement of the same parameter. Once the refined level of interest is determined, the device is activated.

According to another embodiment of the invention, the second sensor is 'triggered', or begins sensing, only when the first condition has been met; that is, the second sensor is in a standby mode when the first condition has not been met. Furthermore, the device is 'triggered', or becomes active, only when both the first and second conditions have been met.

BRIEF DESCRIPTION OF THE DRAWINGS

For a better understanding of the present invention, and to show more clearly how it may be carried into effect, reference will now be made to the following drawings, in which.

DETAILED DESCRIPTION OF EMBODIMENTS OF THE INVENTION

Figure 1A:
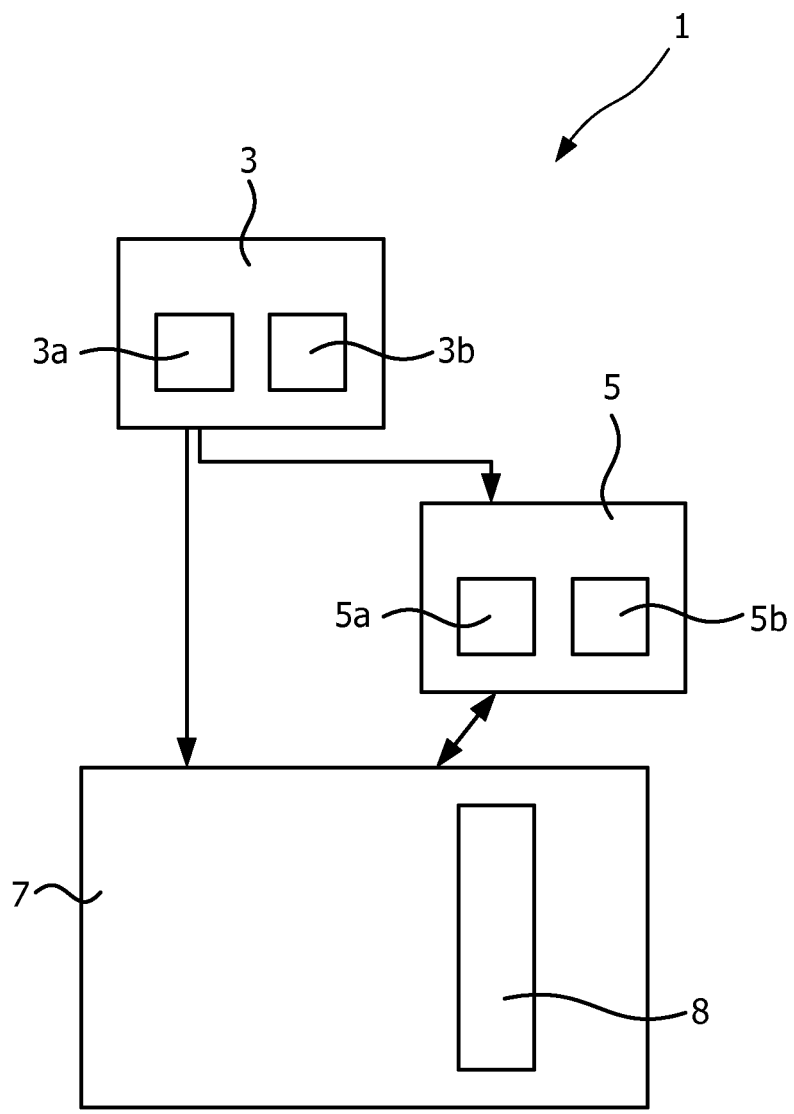
FIG. 1a shows a representation of a system according to an embodiment of the present invention.

With reference to FIG. 1a, a system 1 of an embodiment of the present invention comprises a first sensor 3. The first sensor 3 includes a first sensor memory 3a for recording a sequence of first measurements and a first sensor processor 3b for analysing the first measurements in order to determine whether a first condition has been met. The first sensor 3 is communicatively coupled to a second sensor 5. The second sensor 5 includes a second sensor memory 5a for recording a sequence of second measurements and a second sensor processor 5b for analysing the second measurements in order to determine whether a second condition has been met. The second sensor 5 and the first sensor 3 are communicatively coupled to a device 7. The device 7 includes a user interface 8, and has at least two modes of operation: an active mode and an inactive mode. The first sensor 3 is communicatively coupled to the second sensor 5 and the device 7 such that the first sensor 3 sends signals to the second sensor 5 and the device 7. The second sensor 5 is communicatively coupled to the device 7 such that the second sensor 5 sends and receives signals to and from the device 7.

Figure 1B:
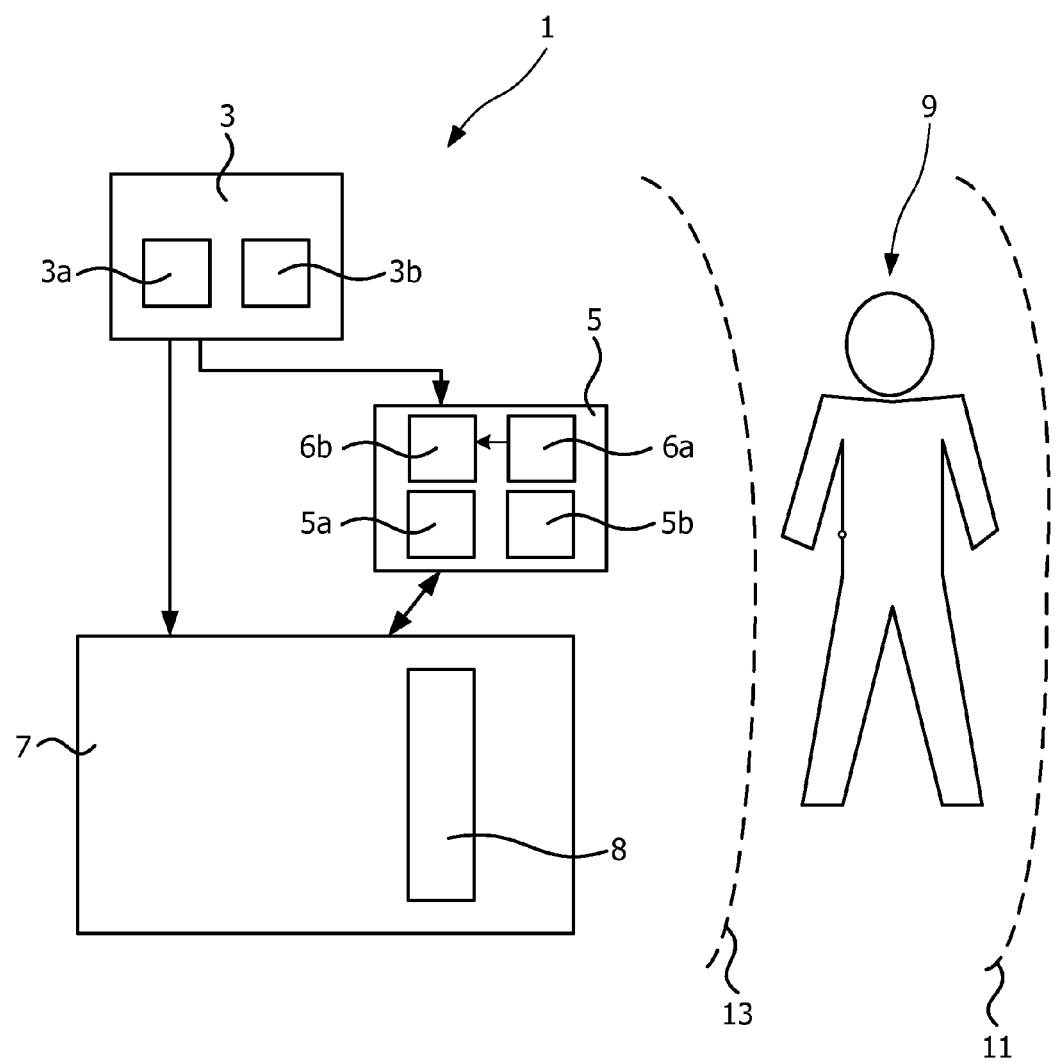
FIG. 1b shows a representation of a system according to another embodiment of the present invention.

With reference to FIG. 1b, a system 1 according to a second embodiment of the present invention a first range sensor 3. The first range sensor 3 includes a first sensor memory 3a for recording a sequence of first measurements and a first sensor processor 3b for analysing the first measurements in order to determine whether a first condition has been met. The first sensor 3 is communicatively coupled to a second sensor 5. The second sensor 5 includes a second sensor memory 5a, a second sensor processor 5b, an image capture device 6a, such as a digital camera, and a gaze detection device 6b in order to determine whether a second condition has been met. The second sensor 5 and the first sensor 3 are communicatively coupled to a device 7. The device 7 includes a user interface 8, and has at least two modes of operation: an active mode and an inactive mode.

The first range sensor 3 is communicatively coupled to the second sensor 5 and the device 7 such that the first sensor 3 sends signals to the second sensor 5 and the device 7. The second sensor 5 is communicatively coupled to the device 7 such that the second sensor 5 sends and receives signals to and from the device 7. The first sensor processor 3b analyses the first measurements in order to determine whether a first condition (relating to a first threshold range 11) has been met. The second sensor 5 includes a second sensor memory 5a for recording a second sequence of measurements and a second sensor processor 5b for analysing the second measurements in order to determine whether a second condition has been met. The first sensor processor 3b is additionally configured for analysing the first measurements in order to determine whether a third condition (relating to a second threshold range 13) has been met. The device 7 includes a user interface 8 for receiving input from a user 9.

The range sensor 3 is communicatively coupled to the second sensor 5 and the device 7, such that the range sensor 3 may send signals to the second sensor 5 and the device 7. The second sensor 5 is communicatively coupled to the device 7, such that the second sensor 5 may send and receive signals to and from the device 7.

Figure 2A:
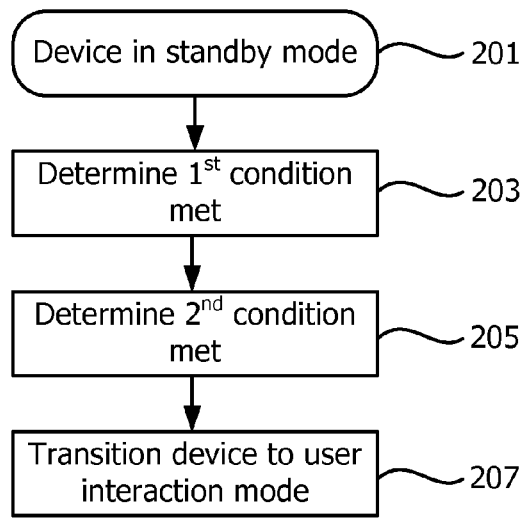
FIG. 2a shows a flow chart describing a first method according to the invention.

FIG. 2a shows a flow chart describing a first method of an embodiment of the invention. The device 7 starts in a standby mode, step 201. Then whether a first condition has been met is determined, step 203. In response, it is then determined that a second condition has been met, step 205. In response, the device is transitioned to a user interaction mode, step 207.

The first condition may relate to the measurement of a first quantity by a first sensor. The second condition may relate to the measurement of a second quantity by a second sensor.

Figure 2B:
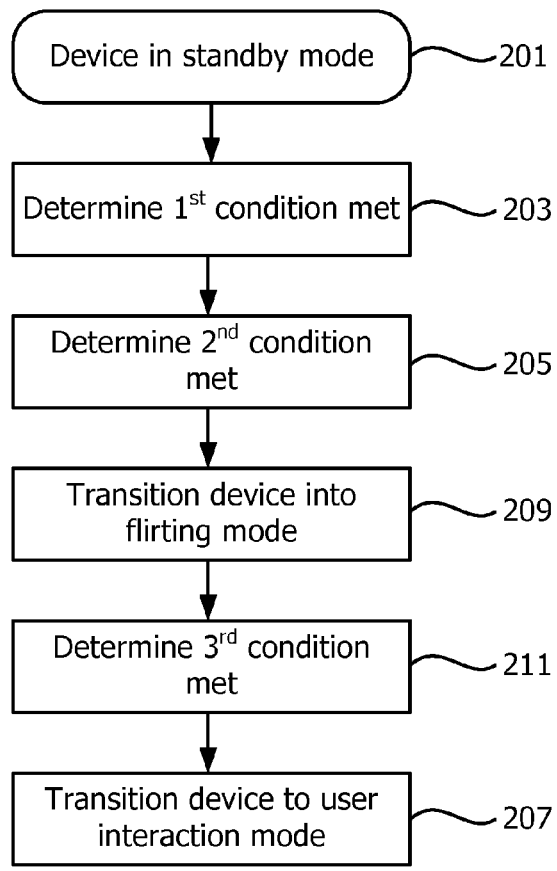
FIG. 2b shows a flow chart describing a second method according to the invention.

FIG. 2b shows a flow chart describing a second method of an embodiment of the invention. Starting with a device in a standby mode, step 201, it is determined that a first condition has been met, step 203. In response, it is then determined that a second condition has been met, step 205 In response, the device is transitioned to a flirting mode, step 209 It is then determined that a third condition has been met, step 211 In response, the device is transitioned to a user interaction mode, step 207.

The third condition may relate to a further measurement of the first quantity by the first sensor. Alternatively, the third condition may relate to direct user interaction with the device.

Figure 2C:
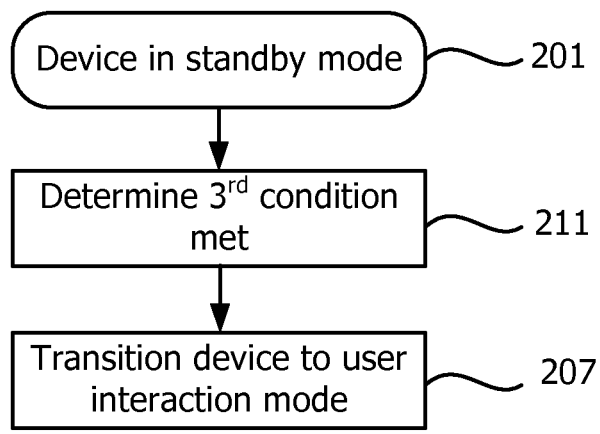
FIG. 2c shows a flow chart describing an optional additional method for use with the methods described in the flow charts of FIGS. 2a and 2b.

FIG. 2c shows a flow chart describing an optional additional method for use with the methods described in the flow charts of FIGS. 2a and 2b. Starting with the device in a standby mode, step 201, it is determined that the third condition has been met, step 211. In response, the device is transitioned directly to a user interaction mode, step 207.

Figure 2D:
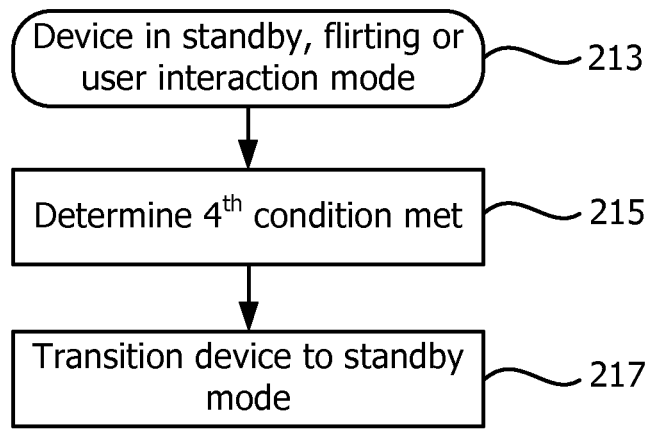
FIG. 2d shows a flow chart describing an optional additional method for use with the methods described in the flow charts of FIGS. 2a, 2b and 2c.

FIG. 2d shows a flow chart describing an optional additional method for use with the methods described in the flow charts of FIGS. 2a, 2b and 2c. Starting with the device in the flirting or user interaction modes, step 213, it is determined whether a fourth condition has been met, step 215 In response the device is transitioned to a standby mode, step 217 Alternatively, starting with the device in the standby mode, step 213 it is determined whether the fourth condition has been met, step 215 In response the device is maintained in the standby mode, step 217 This latter case could be applied, for instance, in the method of FIG. 2b after the determination that the first condition has been met, but before the determination that second condition has been met, thus bypassing the remaining steps.

The fourth condition may relate to the first condition no longer applying. Alternatively, the fourth condition may relate to an absence of user interaction with the device for a predetermined period of time.

Figure 3A:
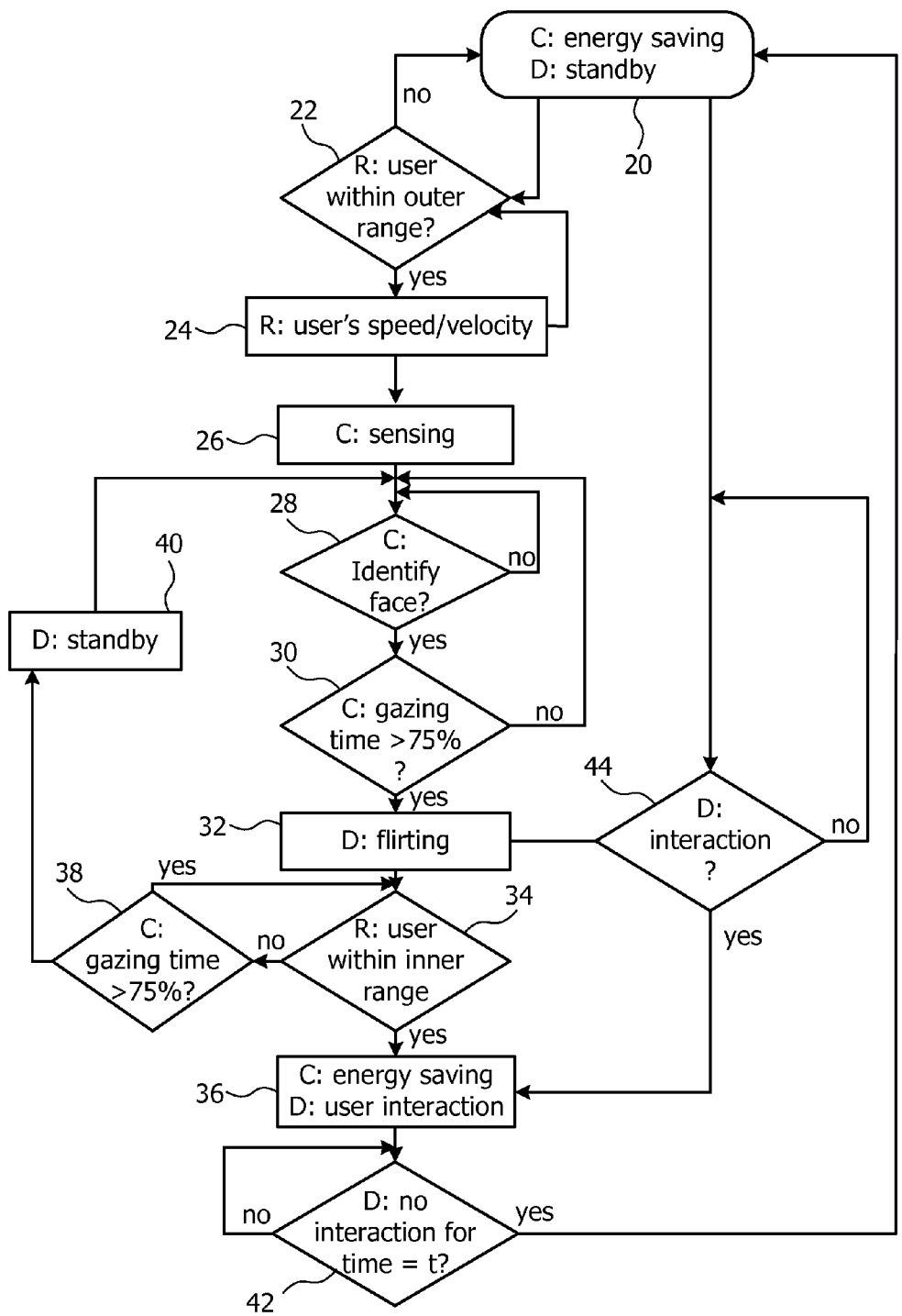
FIG. 3a is a flow diagram according to the present invention.

Operation of the system of FIGS. 1a and 1b will now be described with reference to FIGS. 3a and 3b. The second sensor 5 (C) is in an energy saving mode and the device 7(D) is in a standby mode, step 20. The first sensor 3 (R) determines whether a user 9 is within a range of a first threshold range 11 of the device 7 in step 22. This may be stored and determined by the first sensor memory 3a and first sensor processor 3b. If no, the process returns to step 20. If yes, the process proceeds to a processing step 24, in which the first sensor processor 3b of the first sensor 3 determines the speed or velocity of the user 9. The first sensor 3 continues to monitor that the user is within the range of the first threshold range 11.

If the first sensor 3 determines that the user is within the range of the first threshold, then a first condition has been met and the second sensor 5 is switched to a sensing mode, step 26. The second sensor 5 then determines if a second condition has been met, for example and utterance, gaze or gesture of the user by the second sensor processor 5b or direction of gaze by image capture device 6a and the gaze detection device 6b. In the embodiment of FIG. 2b, the gaze detection device 6b of the second sensor 5 identifies a face of the user 9, step 28. If a face is identified, the second sensor 5 determines (using the image capture device 6a and the gaze detection system 6b) the direction of gaze of the face of the user 9 and (using the second sensor memory 5a and the second sensor processor 5b) what proportion of time the face has been looking at the device 7, step 30. If this is less than, say, 75% a second condition is met, the second sensor 5 continues to monitor the face of the user 9. If this is more than 75%, the device 7 is switched to an active mode, for example a flirting mode, step 32. Although 75% has been specified here, it can be appreciated that any percentage can be used.

The first sensor 3 then determines whether the user 9 is at a range of the device 7 of less than a second threshold range 13. The first threshold range 11 is greater than the second threshold range 13. If yes, the device enters an active mode such as a user interaction mode and the second sensor 5 switches into its energy saving mode, step 36. If no the second sensor 5 again determines what proportion of time the face has been looking at the device, step 38. If this is more than 75%, the first sensor 3 continues to monitor whether the user is at a range of the device 7 of less than the second threshold range 13, step 34. If this is less than 75%, the device 7 is switched back to the standby mode step 40, and the process returns to step 28.

Once the device 7 is in the user interaction mode, a user 9 may interact with the device 7 in any conventional manner. If user interaction is not detected for more than some predetermined time period step 42, the process returns to the step 20 and sets the second sensor 5 to its energy saving mode and the device 7 to its standby mode.

When the device 7 is in the standby or flirting mode, if user interaction with the user interface 8 is detected step 44, the device is switched to the user interaction mode immediately.

Figure 3B:
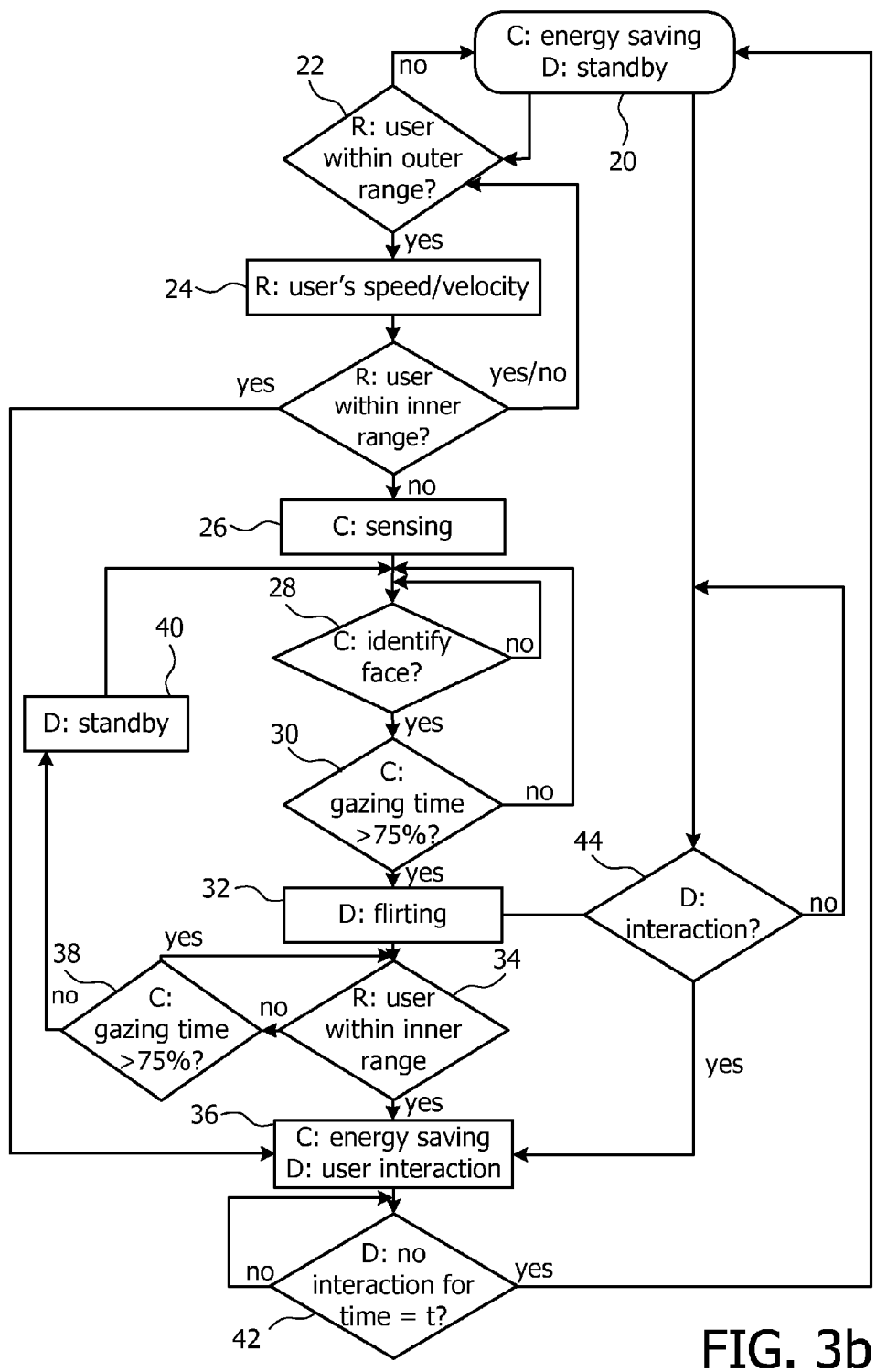
FIG. 3b is an alternative flow diagram according to the present invention.

Alternatively, as shown in FIG. 3b an additional decision step 25 may be included such that if a user 9 is detected by the first sensor 3 to be at a range of the first device 7 of less than the second threshold range 13, then the device 7 is automatically switched to the user interaction mode. Thus, according to this embodiment, the device 7 will enter the user interaction mode when the user 9 is within the second threshold range 13, even when the second sensor 5 has been unable to identify a face or whether the face has been looking at the device 7.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

The invention claimed is:

1. A system for causing a device to enter an active mode starting from a standby mode, said system comprising:
   a first sensor for determining whether a first condition relating to a coarse level of interest of a user has been met;
   a second sensor for determining whether a second condition relating to a more refined level of interest of a user has been met in response to a first signal from the first sensor indicating that the first condition has been met, by measuring a different parameter, or by applying a stricter test to a measurement of the same parameter; and
   a device for entering an active mode in response to the second sensor determining that the second condition has been met,
   wherein the active mode is a mode in which the device advertises its presence to the user by making a noise, illuminating a display or flashing lights,
   wherein the first sensor is additionally configured for determining whether a third condition relating to a third interest level of a user has been met, the third interest level being more refined than the first interest level, by measuring a different parameter, or by applying a stricter test to a measurement of the same parameter,
   and wherein the device is additionally configured for transitioning from the active mode to a user interaction mode in response to the first sensor determining that the third condition has been met.

2. The system as claimed in claim 1, wherein:
   the second sensor is configured for transitioning from an energy saving mode to a sensing mode in response to the first sensor determining that the first condition has been met; and
   the first sensor has a lower energy consumption than the second sensor when the second sensor is in the sensing mode.

3. The system claimed in claim 1, wherein the first sensor is a range sensor, and the first condition comprises:
   whether a user is located at a range from the device of less than a first threshold range;
   whether a user is located at a range from the device that is increasing, decreasing and/or unchanging; or
   whether a user is located at a range from the device that is increasing and/or decreasing above or below some threshold rate.

4. The system claimed in claim 1, wherein the second sensor comprises an image capture device and a gaze detection system, the gaze detection system comprising a facial recognition unit and/or a facial orientation determination unit, and the second condition comprises:
   whether a user is present;
   whether a user is looking at the device; and/or whether a user is looking at the device for more than a predetermined proportion of time since the first signal was received by the second sensor.

5. The system as claimed in claim 1, wherein the device is configured to transition from a standby mode to the active mode in response to the second sensor determining that the second condition has been met, the device being configured for transitioning directly to the user interaction mode from the standby mode, when it is determined that the third condition has been met while the device is in the standby mode.

6. The system as claimed in claim 1, wherein:
the first sensor is configured to measure a parameter from which it is determined whether the first condition has been met, the second sensor determining whether a second condition has been met by measuring a different parameter, and the first sensor is configured for determining whether the third condition has been met by applying a stricter test than the first condition to a measurement of said parameter measured by the first sensor.

7. The system as claimed in claim 1, wherein:
the first sensor is a range sensor;
the first condition comprises whether a user is located at a range from the device of less than a first threshold range; and
the third condition comprises whether a user is located at a range from the device of less than a second threshold range, closer than the first threshold range.

8. The system as claimed in claim 1, wherein the device is configured for transitioning from the user interaction mode to a standby mode in response to a fourth condition being met, and the second sensor is configured for transitioning from a sensing mode to an energy saving mode in response to the fourth condition being met.

9. The system as claimed in claim 8, wherein the fourth condition comprises whether a is located at a range from the device outside the first threshold range and/or whether user interaction with the device is absent for a predetermined period of time.

10. The system as claimed in claim 1, wherein the device is configured to enter the user interaction mode when user interaction with the device occurs.

11. A method of causing a device to enter an active mode, comprising:
determining, with a first sensor, that a first condition relating to a coarse level of interest of a user has been met;
determining a second sensor, that a second condition relating to a more refined level of interest of a user has been met in response to the first sensor determining that the first condition has been met, by measuring a different parameter or by applying a stricter test to a measurement of the same parameter; and
causing a device to enter an active mode in response to the second sensor determining that the second condition has been met,
wherein the active mode is a mode in which the device advertises its presence to the user by making a noise, illuminating a display of flashing lights,
wherein the first sensor is additionally configured for determining whether a third condition relating to a third interest level of a user has been met, the third interest level being more refined than the first interest level, by measuring a different parameter, or by applying a stricter test to a measurement of the same parameter; and
wherein the device is additionally configured for transitioning from the active mode to a user interaction mode in response to the first sensor determining that the third condition has been met.

* * * * *